(12) United States Patent
Eruchimovitch et al.

(10) Patent No.: US 9,026,656 B2
(45) Date of Patent: May 5, 2015

(54) RESOURCE SHARING OVER WIRELESS PERSONAL AREA NETWORKS

(75) Inventors: Baruch Eruchimovitch, Haifa (IL); Gilad Bornstein, Haifa (IL); Nir Strauss, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 12/264,458

(22) Filed: Nov. 4, 2008

(65) Prior Publication Data
US 2010/0115096 A1    May 6, 2010

(51) Int. Cl.
*G06F 15/16*    (2006.01)
*H04W 52/02*    (2009.01)
*H04W 28/00*    (2009.01)
*H04W 84/20*    (2009.01)

(52) U.S. Cl.
CPC .............. *H04W 52/02* (2013.01); *H04W 28/00* (2013.01); *H04W 84/20* (2013.01)

(58) Field of Classification Search
CPC ..................................................... H04W 52/02
USPC ......................................................... 709/226
See application file for complete search history.

(56) References Cited

U.S. PATENT DOCUMENTS

2003/0236890 A1*  12/2003  Hurwitz et al. ............... 709/227
2004/0116141 A1*  6/2004   Loven et al. .................. 455/519
2004/0128382 A1   7/2004   Shimoda et al.
2005/0120119 A1*  6/2005   Bhanu et al. .................. 709/229
2009/0252134 A1*  10/2009  Schlicht et al. ............... 370/338
2010/0082784 A1*  4/2010   Rosenblatt et al. ........... 709/222

FOREIGN PATENT DOCUMENTS

CN      1762138 A       4/2006
TW      200300639       6/2003
WO      WO2007127878    11/2007

OTHER PUBLICATIONS

Taiwan Search Report—TW098137481—TIPO—Oct. 18, 2012.
International Search Report—PCT/US2009/062948—International Search Authority, European Patent Office, Jul. 21, 2010.
Invitation to Pay Additional Fees—PCT/US2009/062948, International Search Authority—European Patent Office—Apr. 13, 2009.
Written Opinion—PCT/US2009/062948—ISA/EPO—Jul. 21, 2010.

* cited by examiner

*Primary Examiner* — Maceeh Anwari
(74) *Attorney, Agent, or Firm* — Shyam K. Parekh; Thomas A. Jolly

(57) ABSTRACT

Apparatuses and methods to establish and share resources over a personal area network are provided. The units sharing similar functions or common applications are connected by a personal area network such as a low-power radio frequency network such as a ZIGBEE® network such that a selected one of the units sharing the functions or applications runs the application or function for each of the connected units. the similar function or common applications may include, for example, location determinations, data transmission, or the like. The selection of the one unit to run the application may be based on battery charge, processor capacity, or the like.

35 Claims, 6 Drawing Sheets

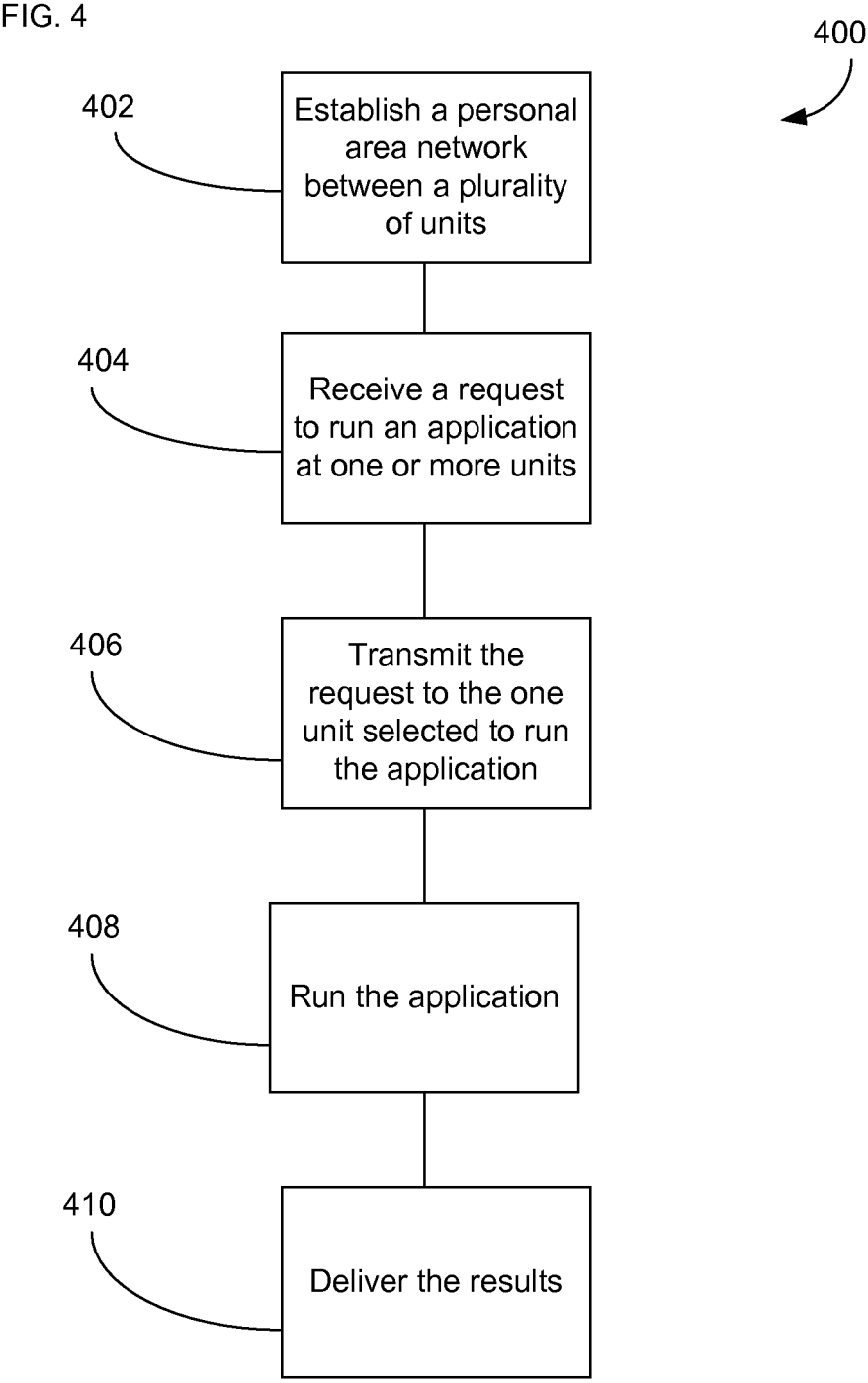

RESOURCE SHARING OVER WIRELESS PERSONAL AREA NETWORKS

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates to personal wireless networks, and more specifically to sharing resources between devices having at least one similar functionality that are co-located in a wireless personal area network.

2. Background

Wireless devices such as cellular telephones, radio frequency identification units, laptop computers, navigation tools, and the like are prevalent today. The ability to identify or determine the location of mobile, wireless devices; mobile, wireless terminals; or other mobile, wireless equipment (hereinafter generally referred to as mobile equipment or ME) is becoming ubiquitous. The location of mobile equipment may be determined or estimated using a number of techniques, as are generally known in the industry, using one or more of a number of networks, including, for example, private and public networks, a WLAN, a WWAN, WiFi, WiMax, or the like. The communication protocols may include, for example, Code Division Multiple Access (CDMA) network protocols, Global System for Mobile Communications (GSM) network protocols, Time Division Multiple Access (TDMA) network protocols, Single-Carrier Frequency Division Multiple Access (SC-FDMA) network protocols, or the like. Additionally, the location or position information may be either a satellite based positioning system, a terrestrial based positioning system, or a hybrid positioning system as is generally known in the art. For example, a satellite based positioning system (SPS) may employ the Global Positioning System (GPS—was originally titled NAVSTAR when developed by the military). Of course, GPS is simply one example of an SPS and other SPSs may be used, such as, for example, other Global Navigation Satellite Systems (GNSS), Galileo positioning system (Europe), Glonass (Russian), Compass/Beidou (Chinese), QZSS (Japanese), a combination thereof, and the like.

According to one exemplary system, the mobile equipment may estimate its position or location based in part on signals received from satellites associated with a SPS, such as the United States' GPS system. Mobile equipment may be configured to communication with a mobile positioning center and/or position determining equipment through an uplink portion of a wireless network and an associated base station to request assistance concerning determining its location. In response to the request, the mobile positioning center and/or positioning determining equipment may transmit the requested information to the mobile equipment through a downlink portion of the wireless network and associated base station. Such requested information may include, for example, identification of satellites currently in view and from which the mobile equipment may be able to receive information regarding the location of the in-view satellites, correction factors, information regarding the Doppler shift to be expected, and the like as is generally known in the art. Transmitting, receiving, and processing the information, acquiring the satellite signals, determining the location, and the like require a significant amount of power that reduces the amount of time the mobile equipment may operate between recharges, new batteries, or the like.

More and more frequently, multiple pieces of mobile equipment are reasonably co-located such that all the pieces of equipment may be considered to be in the same location, such as, for example, containers on a cargo ship, a shipping truck such as a FEDEX® shipping truck, or the like. Additionally, different types of mobile equipment also may be sufficiently co-located as to be considered in the same location. For example, a user of mobile equipment may carry both a cellular telephone and a laptop computer. Today, the equipment may all be fabricated or fitted with a location device, such as those mentioned above. Each piece of mobile equipment, however, separately performs the common application relating to location determination. Thus, two cargo containers, each with a radio frequency identification unit coupled to it, would separately determine their location.

There is, therefore, a need in the art for methods and apparatuses to allow mobile equipment to communicate over a personal area network to allow the mobile equipment to share resources regarding common applications.

SUMMARY

Embodiments disclosed herein address the above stated needs by providing a personal area network for sharing resources. The personal area network includes a plurality of devices adapted to be interconnected by a personal area network. each of the plurality of devices comprising a controller adapted to perform at least one common application on each of the plurality of devices. One of the controllers selected as a master controller for the plurality of devices selects a one of the plurality of devices to perform the at least one common application. The one of the plurality of devices to run the at least one common application and transmit to the others of the plurality of devices the results of the run application, whereby the resources between the plurality of devices are shared such that processing power and battery power may be conserved.

Other embodiments disclosed herein address the above stated needs by providing units adapted to be connected via a personal area network. The unit is adapted to be connected to a plurality of units in a personal area network for sharing resources comprising and the unit includes a controller a personal area network coordinator coupled to the controller and an antenna coupled to the controller. Wherein the controller transmits and receives information over the personal area network regarding shared resources such that another unit runs an application for the unit and the controller is adapted to broadcast information to the another unit to run the application and the controller is adapted to receive results of the application run on another unit.

Still other embodiments disclosed herein address the above stated needs by providing methods of sharing resources among units connected via a personal area network. The methods comprising selecting one of the plurality of units to run an application and transmitting at least one request to run an application to the selected one of the plurality of units over the personal area network. The selected unit runs the requested application on the selected one of the plurality of units; and returns the results of the application.

BRIEF DESCRIPTION OF THE DRAWINGS

FIG. 4 is an illustrative diagram of operational steps associated with the technology of the present application;

DETAILED DESCRIPTION

The technology of the present application will now be explained with reference to illustrative embodiments. However, it should be understood that the technology of the present application is not limited to the illustrative embodiments. In particular, the technology of the present application recognizes the need and desire for mobile equipment to perform certain functions, such as, for example, locating or tracking the mobile equipment, transmitting information to or from the mobile equipment, and the like. The technology of the present application further recognizes the need to efficiently perform the functions to conserves energy or battery life of the mobile equipment among other things. In many instances, any one mobile equipment may be co-located with other mobile equipment that also perform the certain functions. Thus, it has been recognized that a plurality of mobile equipment connectable through a personal area network may share resources to perform the certain functions and converse, among other things, battery life. However, while the technology of the present application may be explained with reference to certain exemplary embodiments herein, one of ordinary skill in the art would recognize on reading the disclosure that other embodiments are possible.

Figure 1:
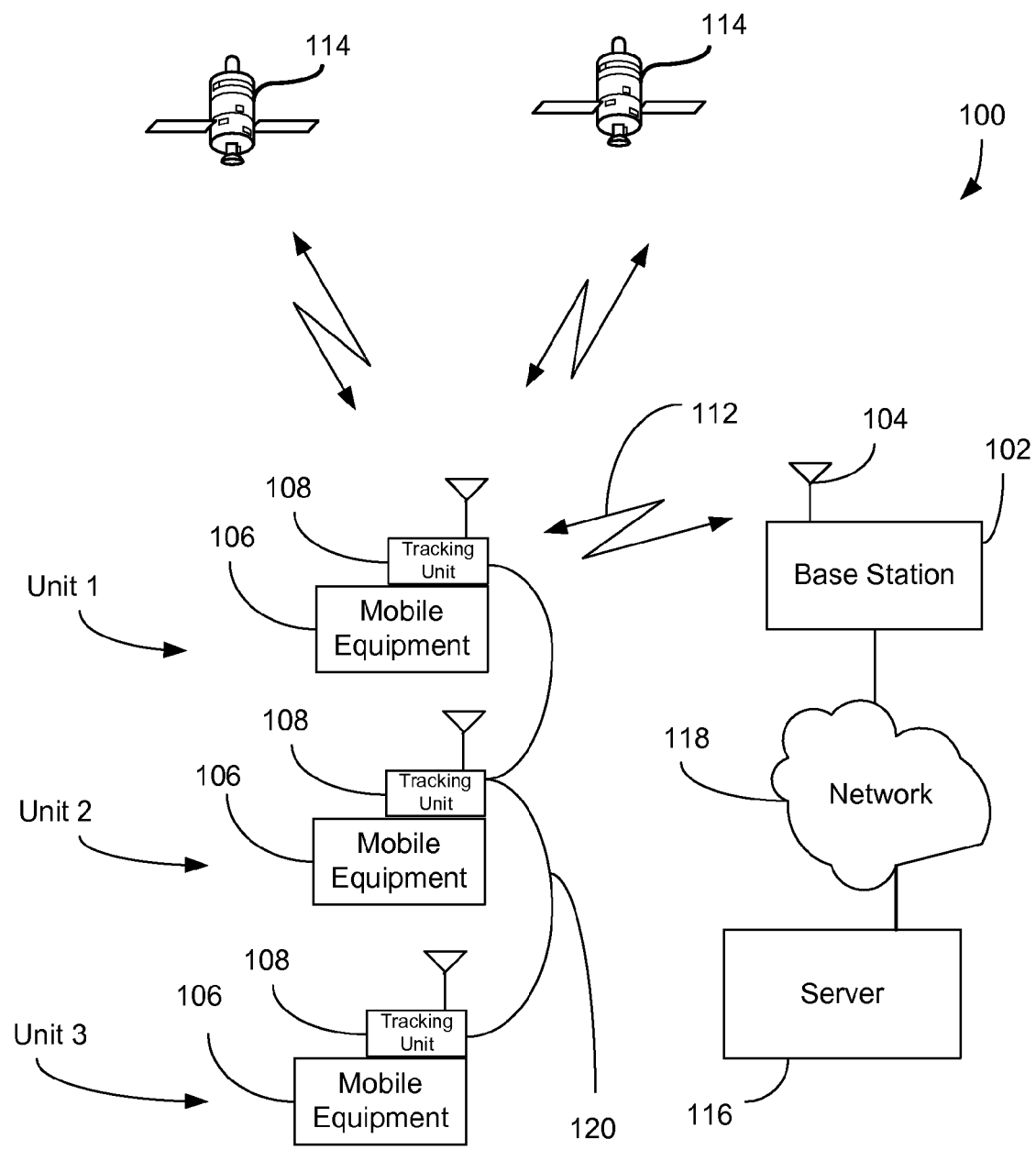
FIG. 1 is a functional block diagram illustrating one possible exemplary embodiment of a system in accordance with the technology of the present application.

Referring now to FIG. 1, an exemplary block diagram of a mobile equipment network 100 is provided. Mobile equipment network 100 includes one or more base stations 102 (of which only one is shown for convenience) having antenna 104 and at least a first plurality of mobile equipment 106, of which three exemplary mobile equipment 106 are provided in FIG. 1, but more or less may be provided. While mobile equipment network 100 is described with reference to mobile equipment 106 as it is envisioned the technology will be useful for mobile assets, it should be understood that one, a plurality of, or all the devices may be location fixed equipment rather than mobile equipment. Base station 102 conventionally would include other components of system 100 that are not shown for convenience and simplicity, such other components include a base station tower (BST), a base station controller (BSC), a mobile switching center (MSC), and the like as are generally known in the art. Each mobile equipment 106 includes in this particular embodiment a tracker 108 connected to an antenna 110. As is common in the art, tracker 108 may include wireless communication components that are used to transmit information through a wireless communication network 112 to the antenna 104 associated with one of the base station 102. Tracker 108 is typically coupled to mobile equipment 106 by fixing the tracker 108 to mobile equipment 106, integrating the tracker 108 into the mobile equipment 106, or implanting the tracker 108 into the mobile equipment. For example, if the mobile equipment is a container, tracker 108 may be affixed to the external surface of the container, similar to conventional RFID technology. If the mobile equipment is a cellular telephone or radio frequency identification unit, the tracker 108 may be integrated into the mobile equipment 106. These are but a few examples of coupling the tracker 108 to the associated mobile equipment 106.

As may be appreciated by this example, each of mobile equipment 106 has a tracker 108 and each has the common application or function of performing location determination. The combination of mobile equipment 106 and tracker 108 may generically be referred to as a unit, such as unit 1, unit 2, and unit 3 as shown. Tracker 108 may continuously, iteratively, randomly, or as requested transmit information to server 116. For example, if mobile equipment 106 is a package on a truck, tracker 108 may transmit the location of the package at predetermined time intervals so server 116 may track the package.

Each tracker 108 contains one or more position sensing receivers that are capable of providing the location of the tracker 108, and, thus, also provide the location of the associated mobile equipment 106. In the exemplary mobile equipment tracking network 100 shown, the position sensing receivers of tracker 108 include satellite signal receivers, such as the GPS receivers described above, that receive signals from a plurality of satellites 114. As is generally understood in the art, a satellite receiver operates to provide location information to a relatively high degree of accuracy by performing well known location determination algorithms based on signals from satellites 114. Other mobile equipment tracking networks 100 may use terrestrial based tracking signals or a combination of terrestrial and satellite signals.

Tracker 108 may connect to a server 116, such as a mobile positioning center or the like via a conventional private or public network 118, such as any of the private and public networks mentioned above or the like. Thus, in one exemplary embodiment, tracker 108 may determine the location of mobile equipment 106 based in part on signals received from satellites 114 associated with GPS, or any satellite positioning system as mentioned above. Tracker 108 may be configured to communicate with server 116, such as a mobile positioning center, position determining equipment, or the like, through an uplink portion of mobile equipment tracking network 100 and the associated base station 102 to request assistance concerning its location. Server 116 may transmit the requested information to the tracker 108 through a downlink portion of mobile equipment tracking network 100 and the associated base station 102. In one exemplary embodiment, such a downlink portion may include pilot channels providing beacon functionality for initial system acquisition, synchronization channels for carrying system parameters required at system acquisition, paging channels used to carry overhead messages, pages, setup messages and orders. Information transmitted to tracker 108 in a downlink portion also may include, for example, commands to control and/or configure the tracker 108 or the like. Other information in one exemplary embodiment may include identification of satellites currently in view and from which tracker 108 may be able to receive information regarding the location of the in-view satellites, correction factors, information regarding the Doppler shift to be expected, and the like as is generally known in the art. Tracker 108 may be capable of obtaining pseudorange measurements based on, for example, signals from satellites 114 at the device using techniques generally known in the art. The location of tracker 108 and the associated mobile equipment 106 may be estimated based on the pseudorange measurements obtained from the acquired satellites 114. Alternatively to estimating its location, tracker 108 may transmit through an uplink via mobile equipment tracking network 100 and base station 102 the pseudorange measurements to server 116 or an application service as is generally known in the art to allow an external application to determine the location of tracker 108 and mobile equipment 106. As can be appreciated, conventional location determination requires use of a processor and the battery to, for example, acquire and track for satellites. Thus, it is desirable to reduce the amount of battery power that is used for location determination.

Also, as shown in FIG. 1, unit 1, unit 2, and unit 3 may be interconnected via personal area network (PAN) 120, which will be explained in more detail below. As shown, personal area network may be a mesh networking system connecting nodes (each of unit 1, unit 2, and unit 3 form a node) by a low power radio frequency connection. The mesh network provides connectivity to new nodes as they enter the personal area network as well as rerouting connectivity as nodes are removed from the network as is generally known in the art. While shown as a low power radio frequency connection, similar to that used in the ZIGBEE® protocols, other personal area network protocols are equally applicable, such as, for example, short-range wireless protocols such as the BLUETOOTH® protocol, ultra wide band, infrared data association, or the like. Generally, the low power radio frequency networks are associated with IEEE 802.15, but private or proprietary low power radio frequency networks are usable with the technology of the present application. Personal area network 120 connecting unit 1, unit 2, and unit 3 also may be via a conventional local area network such as, for example, an Ethernet or the like.

Figure 2:
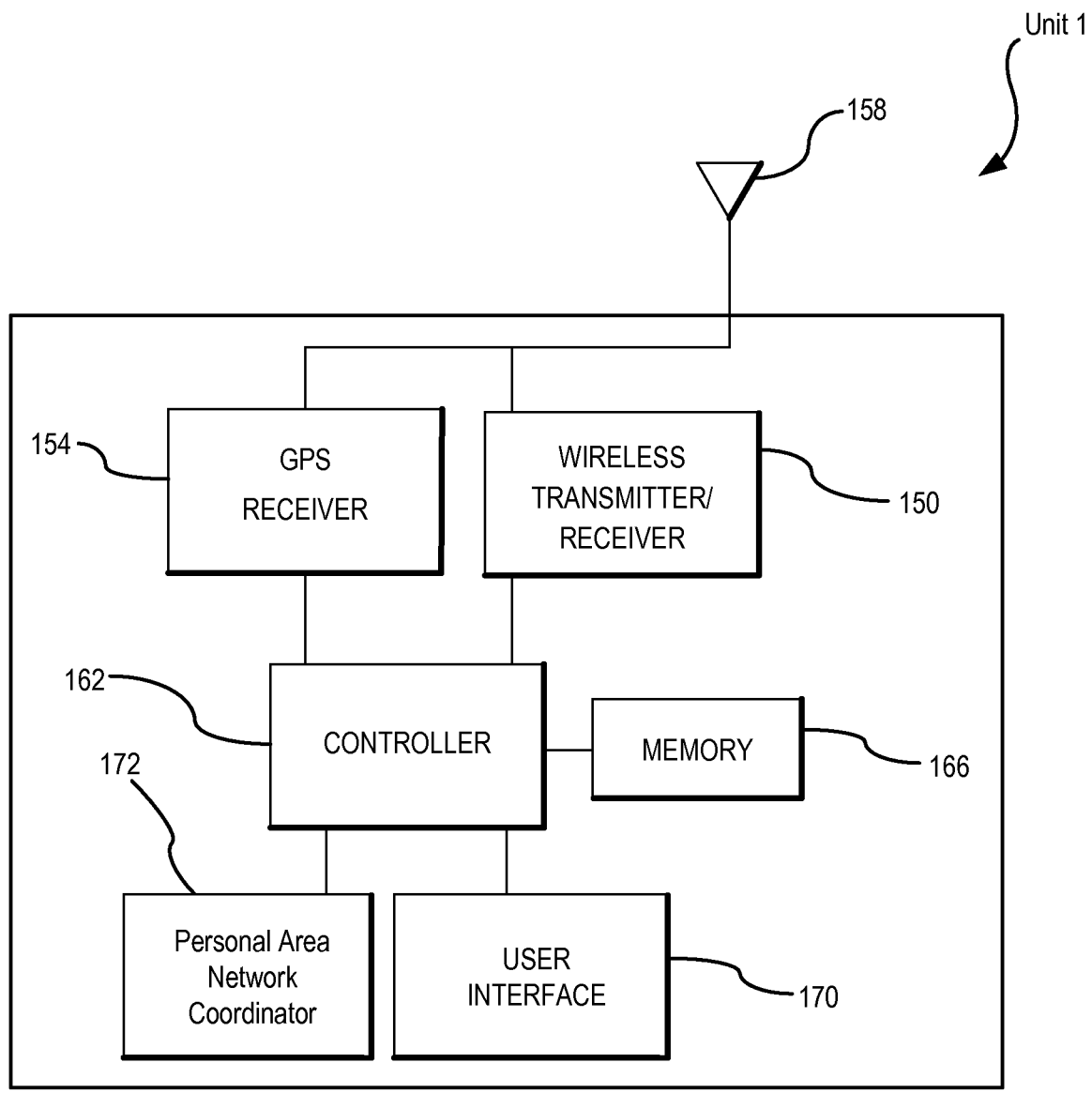
FIG. 2 is a functional block diagram illustrating one possible unit of system 1 in accordance with the technology of the present application.

Referring now to FIG. 2, an exemplary embodiment of a portion of unit 1 is provided. The unit 1 includes a wireless transmitter/receiver 150, a GPS receiver 154 and an antenna 158. The wireless transmitter/receiver 150 is operable to receive wireless signals that are received at antenna 158 and demodulate the signals and provide them to a controller 162. The controller 162 may be any suitable controller such as a processor, microprocessor, chipset, programmable array, server, computer or the like. The wireless transceiver 150 may also receive signals from the controller 162, modulate the signals onto an RF signal and transmit the modulated signal over the antenna 158. The GPS receiver 154 is operable to receive a GPS signal from an appropriate number of GPS satellites to determine location of the tracking unit 108. The GPS receiver 154 also is connected to antenna 158. Antenna 158, while illustrated as a single antenna, may include one or more separate antennas, such as a separate antenna for the GPS receiver, a send antenna, and/or a receive antenna, and a personal area network antenna as a matter of design choice or need. The controller 162 is coupled to a memory 166 and an optional user interface 170. The controller 162 also is coupled to a personal area network coordinator 172. Personal area network coordinator 172, which is shown as separate from, but could be integrated into the controller 162, operates to allow unit 1, unit 2, and unit 3 to form the personal area network 120. The personal area network coordinator 172, sometimes referred to as the host or root node of the personal area network, may function as an end device or a router depending on whether the unit 1 establishes the personal area network, accepts the role as the coordinator, joins the personal area network, or the like as is generally know in the industry for building personal area networks. The controller 162 controls operations of the unit 1 including operating any applications that are running on the unit 1. The memory 166 may include any type of memory suitable for such devices including volatile and/or non-volatile memory. The memory 166 includes code to run the different applications for the unit 1 including the code to run and manage the personal area network 120. The optional user interface 170 may be any appropriate user interface including a visual and/or graphical user interface and associated keypad and/or any other physical input device.

The memory 166, as will be explained further below, may be used to store information regarding other units (such as unit 2 and unit 3 in this exemplary embodiment) that run one or more common application. While unit 1 as shown and described includes the GPS receiver 154, one of ordinary skill in the art would recognize that unit 1 may use any of the SPS described above. Moreover, unit 1 may use assisted GPS, terrestrial based location systems, hybrid systems, combinations thereof, or the like. Finally, while location services are one useful application of the technology of the present application, units 1, 2, and 3, do not necessarily contain location equipment. Location services are simply provided as but one example of a reasonably complex, but generally known, type of application that may be common among devices or units connected by a personal area network 120. Other common applications may be operated using the shared resources over a personal area network, such as, for example, transmission of information over a wireless communication network 112 to base station 102.

Figure 3A:
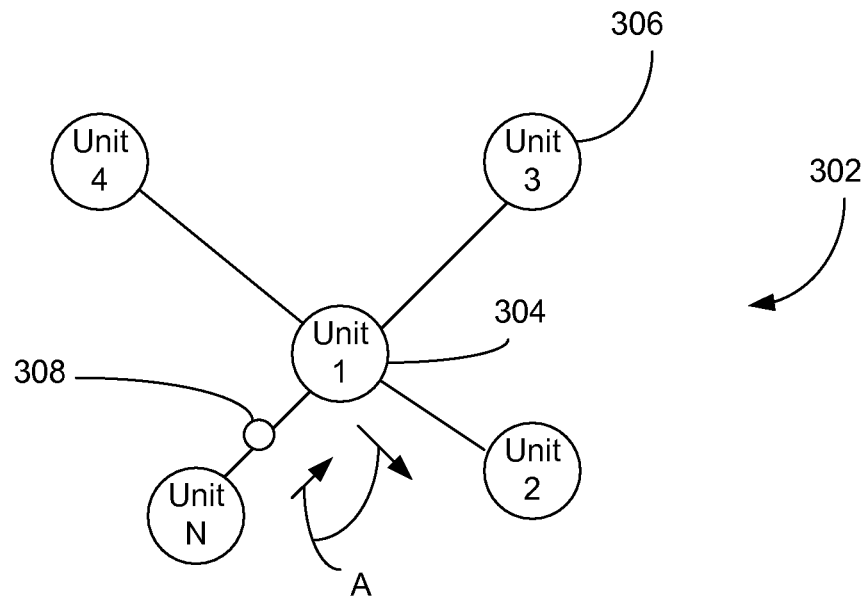
FIG. 3A is a diagram of one possible personal area network configuration in accordance with the technology of the present application.
Figure 3B:
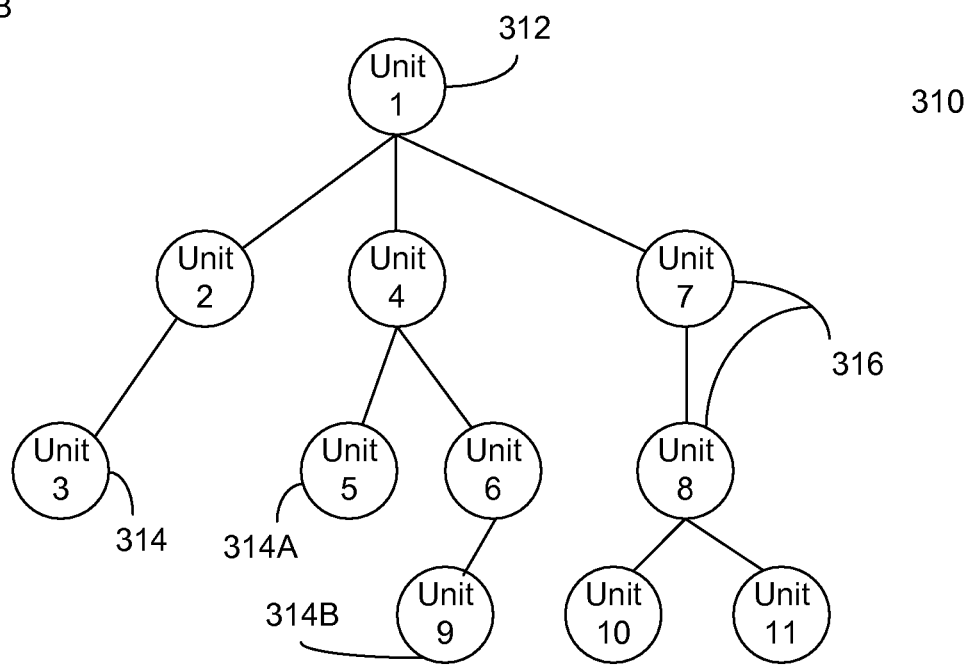
FIG. 3B is a diagram of another possible personal area network configuration in accordance with the technology of the present application.
Figure 3C:
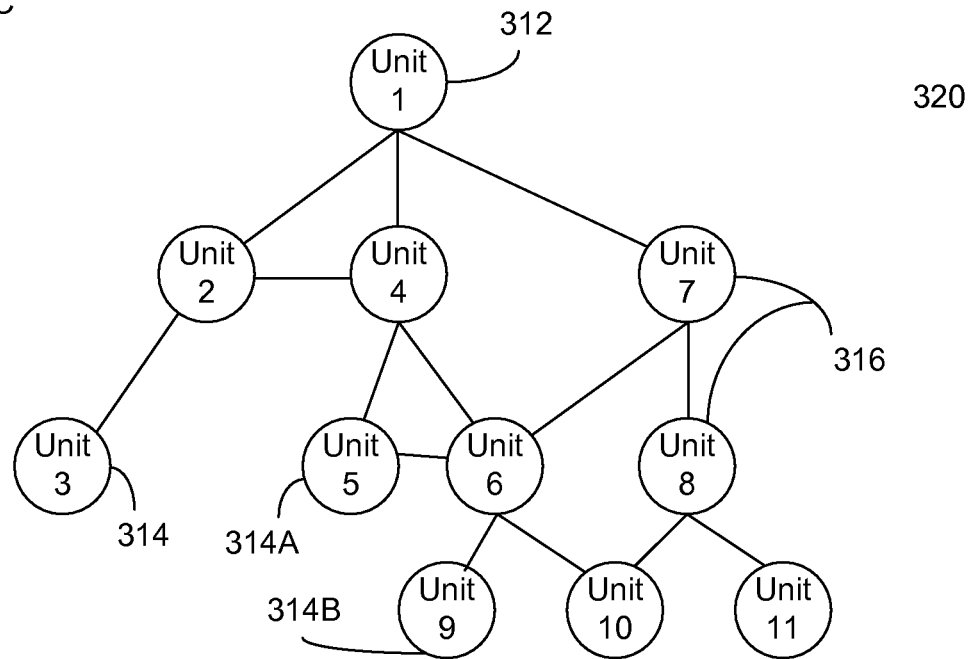
FIG. 3C is a diagram of another possible personal area network configuration in accordance with the technology of the present application.
Figure 3D:
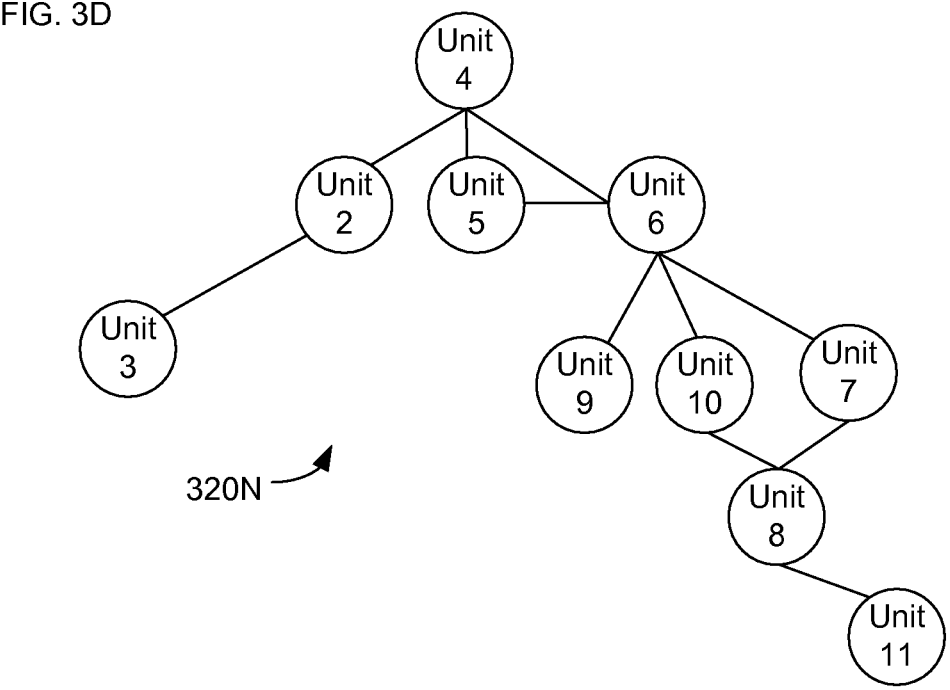
FIG. 3D is a diagram of a reconfigured personal area network of FIG. 3C after the root node is dropped from the personal area network.

Referring to FIGS. 3A, 3B, and 3C, a few exemplary configurations for personal area network 120 are shown. In FIG. 3A, the personal area network 120 is arranged in a star configuration 302. In the star configuration 302, unit 1, for example, may operate as the root node 304. Unit 2 and unit 3, would operate a end devices 306. Messages 308 would traverse the network by transmission from one end device 306, through root node 304, to the destination end device 306 as shown by arrows A. In the star configuration 302, all messages route through the root node 304. As additional units are added to the personal area network 120, the new units, such as unit N, would connect to the root node 304. While shown as unit 1 acting as the root node, any of the units may act as root nodes or end devices. Typically, the root node is identified by the device that initiates the network. Another configuration for the personal area network 120 is the tree configuration 310. The tree configuration also includes the root node 312 and end devices 314, but also includes routers 316. In the tree configuration, the top of the tree, i.e., the root node 312, is considered the original parent node and the routers and children nodes. Each router has a parent node, up the tree, and may have a child node, down the tree. Messages are passed from children up to parent nodes and back down. Thus, end device 314A may communicate with end device 314B by sending a message to router unit 4, router unit 6, and finally to end device 314B. Another configuration for a personal area network 120 is a mesh network 320. Mesh network 320 is similar to tree network 310, but nodes may have multiple connections as shown by the connection between routers of unit 2 and unit 4, between end unit 5 and router unit 6, and the like. Thus, under a tree configuration, unit 3 would send a message to unit 5 via unit 2, unit 1, and unit 4 whereas a mesh network would send a message from unit 3 to unit 5 via unit 2 and unit 4 bypassing unit 1 in this exemplary structure. Mesh networks are typically more robust than either a star or tree configuration as they allow for continuous reconfiguration of the personal area network. Unlike a star configuration, which is disabled if the root node drops from the network, a mesh network would rearrange itself to establish a new root node. For example, if unit 1 in mesh network was dropped, an new mesh network 320N may be configured such that unit 4 was the root or top node as shown in FIG. 3D.

Connecting unit 1, unit 2, etc. via a personal area network 120 allows the separate units to share resources. For example, referring to mesh network 320, unit 11 and unit 9 may need to transmit data over wireless communication network 112. Instead of each of unit 11 and unit 9 powering the transmitting portions of the devices, unit 11 may, for example, send its data to unit 9, and unit 9 would transmit the data for both unit 11 and unit 9—which may conserve battery power associated with unit 11. Similarly, both unit 11 and unit 9 may transmit their data to unit 5 that transmits the data.

Referring now to FIG. 4, an exemplary flowchart 400 illustrating operational steps associated with the technology of the present application is provided. The flowchart 400 describes an exemplary embodiment where the common application is a location determination. One of ordinary skill in the art will now recognize that other common applications, such as, transmission of data over the wireless communication network 112, may be similarly performed. Moreover, the associated steps are provided as discrete steps in a particular order but it should be understood that various steps may occur iteratively, continuously, or the like. The steps as provided also may be combined with other steps and performed in different orders.

In the exemplary flowchart 400, first, at step 402, a personal area network 120 is established between a plurality of units. Next, one or more of the plurality of units connected by a personal area network 120 receives a request to run an application, such as, for example, a location determination request, step 404. The request to run an application is transmitted to the one of the plurality of units assigned to perform the location determination request, step 406. The one of the plurality of units assigned to run the application for the personal area network would run the application in a conventional manner to obtain a result, which result may simply be a confirmation that the application was run, for the one or more units connected by the personal area network 120, step 408. The one of the plurality of units assigned to run the application would deliver the result(s) to at least the one or more units that received the request to run the application, but the information may be transmitted to all the plurality of units connected by the personal area network, step 410.

Figure 5:
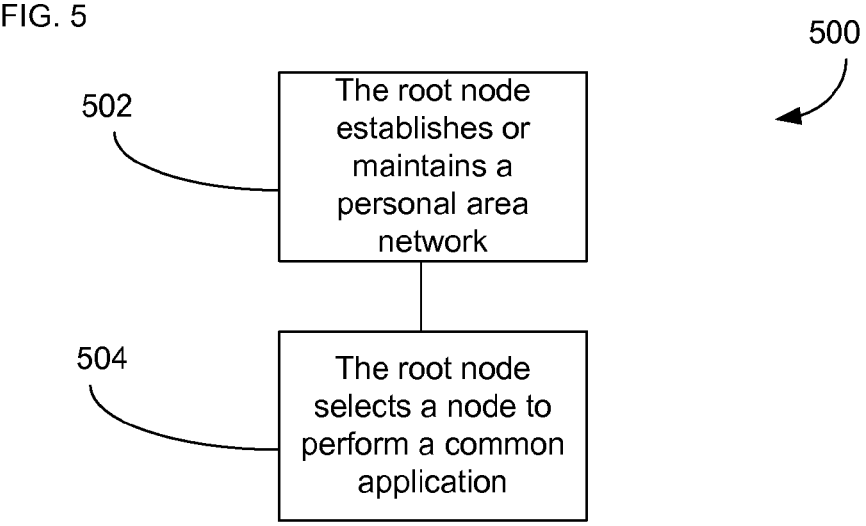
FIG. 5 is an illustrative diagram of operational steps associated with the technology of the present application.

As mentioned above with respect to the various types of personal area networks 120, the networks typically are set up with a root node that initiates the personal area network. This node would select one of the connected devices to perform particular shared resources or applications. In that regard, FIG. 5 shows an exemplary flowchart 500 illustrating operational steps associated with the technology of the present application is provided. In particular, the root node, such as unit 1 shown in FIGS. 1 and 2, establishes or maintains a personal area network between it and at least one other unit, such as units 2 and 3, step 502. Next, the root node selects one of the nodes, such as any of unit 1, unit 2, or unit 3, to perform sharable applications, step 504. Sharable applications, as identified above, may include location determination requests, transmission of data requests, or the like. The selection of a node may be based on a number of protocols as a matter of design choice. For example, the root node may select a router node or the root node itself as those nodes are not allowed to sleep or hibernate to maintain the personal area network. The root node may select any of the root node, a router node, or an end device node based on the device having the highest the battery charge. The root node may select any of the root node, a router node, or an end device node based on the controller 162 having the most available processor (i.e., a load balancing procedure). The root node may select the node to run the application based on a round robin pattern. The root node may select the node to run the application based on a random pattern. The selection may be on these, a combination of these, or other not listed factors and the like. Also, the selection of the node to run the application may be made by the root node, the router nodes, or end device nodes as a matter of system design or configuration.

Figure 6:
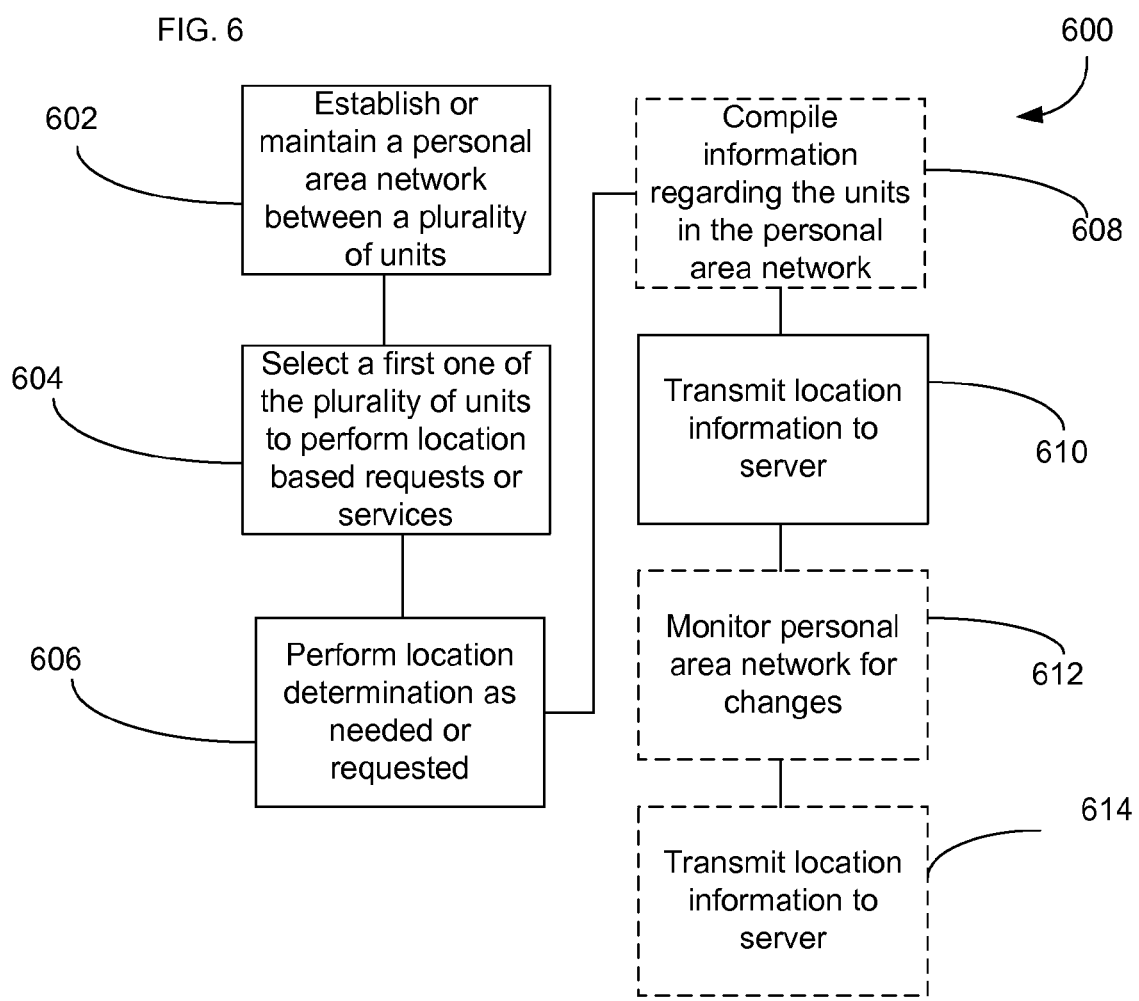
FIG. 6 is an exemplary flowchart of a tracking operation consistent with the technology of the present application.

Referring to FIG. 6, an exemplary flowchart 600 of a tracking operation consistent with the technology of the present invention is provided. Flowchart 600 is an exemplary embodiment of the tracking units 108 attached to, for example, cargo 106 as the mobile equipment. First, a personal area network is established or maintained between the plurality of units, step 602. Next, a first one of the plurality of units is selected to respond to location based requests or provide location based services in a conventional manner for the plurality of units connected by the personal area network, step 604. The selected one of the plurality of units performs the location determination as needed or requested, step 606, in a conventional manner. Optionally, the information regarding the units (i.e., a unique ID that may be associated with each tracker 108 associated with the unit 1, unit 2, unit 3, or the like) may be compiled, step 608. The location information for the units connected in the personal area network may be transmitted to server 116 via base station 102 to track unit 1, unit 2, unit 3, etc., step 610. Optionally, the information regarding the units also is transmitted in step 610 to server 116. The root node, optionally, may monitor the personal area network 120 for configuration changes, step 612. Such configuration changes may include adding a node, dropping a node, reconfiguring the root node, or the like. Changes may cause the selected one of the plurality of units performing the location determination to transmit location information to server 116, step 614. Thus, server 116 may be able to determine the last known location of mobile equipment or initial location of mobile equipment as the mobile equipment is added or dropped from the personal area network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A personal area network for sharing resources, the personal area network comprising:
   a plurality of devices configured to be interconnected by a personal area network;
   each of the plurality of devices comprising a controller that is configured to run at least one common application as provided at each of the plurality of devices; and
   wherein at least one of the controllers is a master controller for the plurality of devices, the master controller being configured, in response to a received request to run the at least one common application, to select, based on one or more selection processes, one of the master controller or another controller from the plurality of devices to perform the at least one common application, the master controller being available to be selected by the master controller to perform the at least one common application; and
   wherein the selected one of the master controller or the another controller, in response to being selected by the master controller, is configured to:
      run the at least one common application as provided there at, and
      initiate transmission of one or more results obtained from the at least one common application to at least one other device of the plurality of devices.

2. The personal area network of claim 1 wherein the personal area network comprises a protocol selected from the group of personal area networks consisting of: low-power radio, short-range wireless, ultra wide band, Ethernet, or infrared data association.

3. The personal area network of claim 1 comprising at least one other device in addition to the plurality of devices which is coupled to the personal area network that does not run the at least one common application.

4. The personal area network of claim 1 wherein the at least one common application comprises a location determination application.

5. The personal area network of claim 4 wherein the one or more results comprise a determined location.

6. The personal area network of claim 1 wherein the at least one common application comprises a communication network transmission application.

7. The personal area network of claim 6 wherein the one or more results comprise a confirmation corresponding to information transmitted over a communication network.

8. The personal area network of claim 1 wherein the master controller is configured to select the one of the master controller or the other controller from the plurality of devices based, at least in part, on an indication of processor availability.

9. The personal area network of claim 1 wherein the master controller is configured to select the one of the master controller or the other controller from the plurality of devices based, at least in part, on an indication of battery charge.

10. The personal area network of claim 5 wherein the master controller is configured to initiate transmission of a last known location of a leaving device in response to the leaving device leaving the personal area network.

11. The personal area network of claim 1 wherein the master controller is configured to select the one of the master controller or the other controller from the plurality of devices based, at least in part, on a predetermined pattern.

12. The personal area network of claim 11 wherein the predetermined pattern is a round robin pattern.

13. The personal area network of claim 1 wherein the master controller is configured to select the one of the master controller or the other controller from the plurality of devices based, at least in part, on a random pattern.

14. The personal area network of claim 1 further comprising at least one other device in addition to the plurality of devices which is coupled to the personal area network that is not provided with the at least one common application.

15. A master unit for use in a personal area network that includes a plurality of units, the master unit comprising:
   a controller; and
   a personal area network coordinator coupled to the controller;
   wherein the controller is configured to transmit and receive information over the personal area network, and in response to a received request to run a common application residing on each of the master unit and the plurality of units, to:

select a first unit from the master unit and the plurality of units to run the common application based on one or more selection processes, instruct the first unit to run the common application residing on the first unit, and cause the first unit to return results of the common application run on the first unit to at least a second unit of the plurality of units other than the first unit and other than the master unit, wherein the master unit is available to be selected as the first unit by the controller of the master unit to run the common application.

16. The master unit of claim 15 wherein the personal area network is selected from a group of personal area networks consisting of: low-power radio, short-range wireless, ultra wide band, Ethernet, or infrared data association.

17. A method of sharing resources common to a plurality of units connected over a personal area network, the method comprising:

selecting by a master unit from the plurality of units, in response to a received request to run an application residing on each of the plurality of units, one of the master unit or another unit from the plurality of units to run the application based on one or more selection processes, the master unit being available to be selected by the master unit to run the application;

transmitting at least one request to run the application to the selected one of the master unit or the other unit from the plurality of units over the personal area network;

running the requested application on the selected one of the master unit or the other unit from the plurality of units; and returning results of the running of the application to at least one of the plurality of units other than the selected one of the master unit or the other unit from the plurality of units.

18. The method of claim 17 comprising establishing the personal area network between the plurality of units.

19. The method of claim 17 comprising maintaining the personal area network.

20. The method of claim 17 comprising reconfiguring the personal area network.

21. The method of claim 17 wherein selecting the one of the master unit or the other unit from the plurality of units to run the application comprises selecting the one having the most battery charge.

22. The method of claim 17 wherein selecting the one of the master unit or the other unit from the plurality of units to run the application comprises selecting a unit having a battery charge over a predetermined threshold.

23. The method of claim 17 wherein selecting the one of the master unit or the other unit from the plurality of units to run the application comprises selecting a unit having processor capacity.

24. The method of claim 17 wherein the application comprises a location determination application.

25. The method of claim 24 wherein a location of the plurality of units is transmitted to a server.

26. The method of claim 25 further comprising monitoring the personal area network for configuration changes and transmitting a location to a server when the configuration of the personal area network changes.

27. The method of claim 24 further comprising compiling information regarding the plurality of units.

28. The method of claim 27 wherein the information is a unit identification.

29. The method of claim 17 wherein the application causes information transmission to a base station.

30. A computer program product comprising:

a non-transitory computer readable storage medium storing program code comprising:

program code to cause the selection by a master unit from a plurality of units, in response to a received request to run an application residing on each of the plurality of units, of one unit of the master unit or another unit from the plurality of units connected via a personal area network to run the application based on one or more selection processes, the master unit being available to be selected by the master unit to run the application; and program code to cause at least one request to run the application to be transmitted to the selected one unit of the master unit or the other unit of the plurality of units and to cause the selected one unit of the master unit or the other unit of the plurality of units to return results of running of the application to at least one of the plurality of units other than the selected one of the master unit or the other unit of the plurality of units.

31. The computer program product of claim 30 further comprising program code to establish and maintain the personal area network coupling the plurality of units.

32. The computer program product of claim 30 further comprising program code to run location determinations.

33. The computer program product of claim 30 further comprising program code to transmit data to a base station.

34. A personal area network for sharing resources, the personal area network comprising:

means for connecting a plurality of units;

means for selecting by a master unit from the plurality of units, in response to a received request to run an application residing on each of the plurality of units, one of the master unit or another unit from the plurality of units to run the application based on one or more selection processes, the master unit being available to be selected by the master unit to run the application;

means for transmitting requests to run the application to the selected one of the master unit or the other unit from the plurality of units;

means, residing on the selected one of the master unit or the other unit from the plurality of units, for running the application; and means for returning results of running the application to at least one of the plurality of units other than the selected one of the master unit or the other unit from the plurality of units.

35. The personal area network of claim 1, wherein the master controller is further configured to:

select one of the plurality of devices as a device configured to maintain the personal area network without entering sleep mode or hibernation mode of operation, wherein a root device that includes the master controller is available to be selected by the master controller as the device configured to maintain the personal area network.

* * * * *